United States Patent [19]

Ebbers et al.

[11] Patent Number: 5,123,022
[45] Date of Patent: Jun. 16, 1992

[54] FREQUENCY MIXING CRYSTAL

[75] Inventors: Christopher A. Ebbers, Livermore; Laura E. Davis, Manteca; Mark Webb, Salida, all of Calif.

[73] Assignee: The United States of America as represented by the Department of Energy, Washington, D.C.

[21] Appl. No.: 598,303

[22] Filed: Oct. 16, 1990

[51] Int. Cl.$^5$ .......................... H01S 3/109; H03F 7/00
[52] U.S. Cl. ........................................ 372/22; 372/21; 328/326
[58] Field of Search .................... 372/21, 22; 307/424, 307/425, 427; 252/582, 584; 350/353, 354, 96.3

[56] References Cited

U.S. PATENT DOCUMENTS

| | | | |
|---|---|---|---|
| 3,830,558 | 8/1974 | Deserno et al. | 350/160 |
| 3,975,693 | 8/1976 | Barry et al. | 331/94.5 |
| 4,386,428 | 5/1983 | Baer | 372/41 |
| 4,697,100 | 9/1987 | Eimerl | 307/427 |
| 4,818,899 | 4/1989 | Tiers | 307/425 |
| 4,876,688 | 10/1989 | Wang et al. | 372/22 |

OTHER PUBLICATIONS

R. L. Bogdanovskaya, L. N. Armisheva, "Isothermal Solubility in the La(NO$_3$)$_3$—KNO$_3$—H$_2$O System at 20 and 50° C.," Uch. Zap., Perm Univ. No. 289, 32-35 (1973).
E. F. Zhuravlev, "Solubility In Ternary Aqueous Salt Systems Containing Ce(NO$_3$) and an Alkali Metal Nitrate," Russian J. Inorg. Chem. 8, 1017–1021 (1963).

*Primary Examiner*—William L. Sikes
*Assistant Examiner*—Galen J. Hansen
*Attorney, Agent, or Firm*—Paul R. Martin; L. E. Carnahan; William R. Moser

[57] ABSTRACT

In a laser system for converting infrared laser light waves to visible light comprising a source of infrared laser light waves and means of harmoic generation associated therewith for production of light waves at integral multiples of the frequency of the original wave, the improvement of said means of harmonic generation comprising a crystal having the chemical formula $$X_2 Y(NO_3)_5 \cdot 2 n Z_2 O$$

wherein X is selected from the group consisting of Li, Na, K, Rb, Cs, and Tl; Y is selected from the group consisting of Sc, Y, La, Ce, Nd, Pr, Sm, Eu, Gd, Tb, Dy, Ho, Er, Tm, Yb, Lu, Al, Ga, and In; Z is selected from the group consisting of H and D; and n ranges from 0 to 4.

22 Claims, 9 Drawing Sheets

FREQUENCY MIXING CRYSTAL

The U.S. Government has rights to this invention pursuant to Contract No. W-7405-ENG-48 between the U.S. Department of Energy and the University of California, for the operation of Lawrence Livermore National Laboratory.

BACKGROUND OF THE INVENTION

1. Field of the Invention

This invention relates to a frequency mixing crystal suitable for use in optical frequency harmonic generators, and other instruments.

More particularly, it relates to a frequency mixing crystal for converting laser emissions in the infrared spectrum into ultraviolet or visible light and vice versa.

Harmonic generation of laser beams using various frequency mixing crystals is known. Harmonic generating apparatus is particularly useful for high-intensity laser systems where intense optical power is easily and relatively efficiently obtainable for certain longer wavelengths but not at shorter wavelengths. For example, neodymium-glass lasers produce wavelengths in the one micron infrared range. Direct production of green in the one-half micron range or ultraviolet in the one-third micron range is not easily or efficiently accomplished. Therefore, harmonic generators which convert laser beams from those which have wavelengths in the infrared region to those in the visible light region perform an important, useful function.

2. Prior Art

One of the earliest harmonic generation experiments was performed by Franken et al. in 1961, shortly after the invention of the laser. See Franken, P.A., Hill, A.E., Peters, C.W., and Weinreich, G., "Generation of Optical Harmonics," Phys. Rev. Lett., 118 (1961). In that experiment, a pulse from a ruby laser at 694.3 nm was focused into a quartz crystal and a very small amount of energy at the second-harmonic frequency 347.15 nm was obtained.

To be practically useful, much greater conversion efficiencies were required, and a technique called phase-matching was developed to improve conversion efficiency. Phase-matching is required because the fundamental wave travels through the material at a different velocity than does the harmonic wave generated by the fundamental due to normal dispersion. If the proper phase between the fundamental and harmonic waves is not maintained, the second-harmonic waves generated at different points in the material destructively interfere resulting in poor conversion efficiency.

Second and third-harmonic waves are obtained with the use of so called non-linear frequency mixing crystals. See "Optical Waves in Crystals," Yariv et al., John Wiley & Sons, 1984, Chapter 12 in particular. A non-linear crystal is one in which the output wave does not depend purely on the input wave.

Commonly used for harmonic or frequency conversion are birefringent crystals, such as potassium dihydrogen phosphate (KDP). KDP has the characteristic that, for a fundamental input wave which is a linearly polarized ordinary wave, the resulting second-harmonic is an extraordinary wave. If the crystal is oriented so that the index of refraction of a fundamental ordinary wave equals, or is matched to, the index of refraction of the second-harmonic wave, the various second-harmonic waves produced as the fundamental wave propagates through the crystal will constructively interfere and greatly improve the conversion efficiency of the crystal.

Frequency conversion of the 1.053 micrometer output of high-power neodymium-glass lasers recently has received much interest at the Lawrence Livermore National Laboratory. Irradiation of laser fusion targets by shorter wavelengths provides significant advantages. Production of third-harmonic waves at 0.35 micrometers from 1.053 micrometer, high-intensity waves were reported by Seka et al. in "Demonstration of High Efficiency Third-Harmonic Conversion of High-Power Nd-Glass Laser Radiation," Optics Communications, Vol. 34, No. 3, p. 469 (1980). The apparatus incorporated spatially separated Type II KDP crystals.

The Nova Laser Fusion Project at the Lawrence Livermore National Laboratory requires large-aperture, high-fluence lasers beams at the second and third-harmonics of the 1.053 micrometer wavelength Nd-glass lasers.

The KDP family of frequency mixing crystals, described in U.S. Pat. No. 3,949,323, can be used in conjunction with Nd-glass lasers, but they are deficient in a number of respects. In particular, they have low non-linear optical (NLO) coefficients and are moisture sensitive. An ideal crystal would be one which is not difficult to grow, not easily damaged at moderate to high laser power levels, is phase matchable, and has a high relative NLO coefficient.

This invention is concerned with such a crystal.

SUMMARY OF THE INVENTION

It is an object of this invention to provide an improved frequency mixing crystal.

It is a further object of this invention to provide a frequency mixing crystal which has a high relative to KDP non-linear optical coefficient.

It is a still further object of this invention to provide a frequency mixing crystal resistant to damage at moderate to high laser power levels.

It is yet a still further object of this invention to provide a laser system having incorporated therein the frequency mixing crystal described herein.

It is yet another object of this invention to provide a harmonic generation system which incorporates the frequency mixing crystal described herein.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the foregoing and other objects of the invention, a frequency mixing crystal for optical frequency generation is provided which satisfies the above objects and provides significant economic and operational advantages when second and third-harmonic conversion is required in high-power laser systems.

The frequency mixing crystal of this invention has the chemical formula

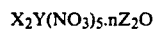

$$X_2Y(NO_3)_5 \cdot nZ_2O$$

wherein X is selected from the group consisting of Li, Na, K, Rb, Cs, Tl and $NH_4$; Y is selected from the group consisting of Sc, Y, La, Ce, Nd, Pr, Sm, Eu, Gd, Tb, Dy, Ho, Er, Tm, Yb, Lu, Al, Ga, and In; Z is selected from the group consisting of H and D; and n ranges from 0 to 4.

Crystals falling within the scope of the above described formula include $K_2La(NO_3)_5.2H_2O$, (KLND), and $K_2Ce(NO_3)_5.2H_2O$ (KCND).

The crystal can be incorporated into a laser system at various locations.

In a typical layout, it is positioned in the path of the laser beam at a point intermediate the beam origin and a focusing lens.

Alternatively, it may serve as a replacement for the laser crystal which is the source of the laser beam.

It can also be used with harmonic generation apparatus such as is described in U.S. Pat. No. 4,510,402, which is incorporated herein by reference.

BRIEF DESCRIPTION OF THE DRAWINGS

The accompanying drawings, which are incorporated in and form a part of the specification, illustrate the invention and, together with the description, serve to explain the principles of the invention. In the drawings.

DETAILED DESCRIPTION OF THE PREFERRED EMBODIMENTS

Reference is now made in detail to the present preferred embodiments of the invention which illustrate the best mode presently contemplated by the inventors of practicing the invention.

The frequency mixing crystals described herein are preferably used in conjunction with neodymium lasers, either neodymium-YAG, or neodymium-glass.

These two types of neodymium lasers have a common energy level structure, but they differ in some ways because of differing properties of the hosts.

The most commonly used host is "YAG", a hard brittle aluminum-garnet crystal. Glass is the second most useful host.

Neodymium-YAG lasers emit light having a wavelength of 1.064 micrometers (1064 nm), in the infrared region.

Frequency doubling the 1064 nm output of a neodymium laser produces green light at a wavelength of 532 nm, while frequency tripling produces a ultraviolet light at 354.5 nm.

Crystal Growth

The crystals of this invention can be grown by various techniques (e.g., by cooling or evaporation).

Both $K_2La(NO_3)_5.2H_2O$ (KLND) and $K_2Ce(NO_3)_5.2H_2O$ (KCND) are grown easily by evaporation from an aqueous solution with starting components of $H_2O$, $KNO_3$, and either $La(NO_3)_3.6H_2O$ or $Ce(NO_3)_3.6H_2O$, respectively. After 4 days a 14 g pyramidal single crystal of KLND was produced from evaporation at 66° C.

Similar techniques can be used to prepare crystals having the alternative chemical formulas described herein.

KLND and KCND both have two waters of hydration for each formula unit. To reduce overtone absorptions at 1.06 $\mu$m, the waters of hydration must be replaced by $D_2O$. This can be accomplished by one of three methods: repeat crystallization, calcining the starting products, or by calcining the desired salts directly. Repeat recrystallization is the most inefficient process, requiring large amounts of $D_2O$ to dilute the hydrogen initially present in the crystal. The starting material $La(NO_3)_3 6H_2O$, may be calcined at a temperature of 160° C., producing a water soluble material with the stoichiometry $La(NO_3)_3.0.4H_2O$. By further drying, possibly in a vacuum oven, it may be possible to remove the last remaining water without decomposition. The desired salt, KLND, may also be dried, removing the waters of hydration and leaving a water soluble compound. However, the same procedure applied to the starting product $Ce(NO_3)_3.6H_2O$ produces a yellow insoluble oxide, probably $CeO_2.nH_2O$. Calcining KCND itself also produces an insoluble compound. Thus, repeat recrystallization is the only method of obtaining deuterated KCND.

Figure 1:
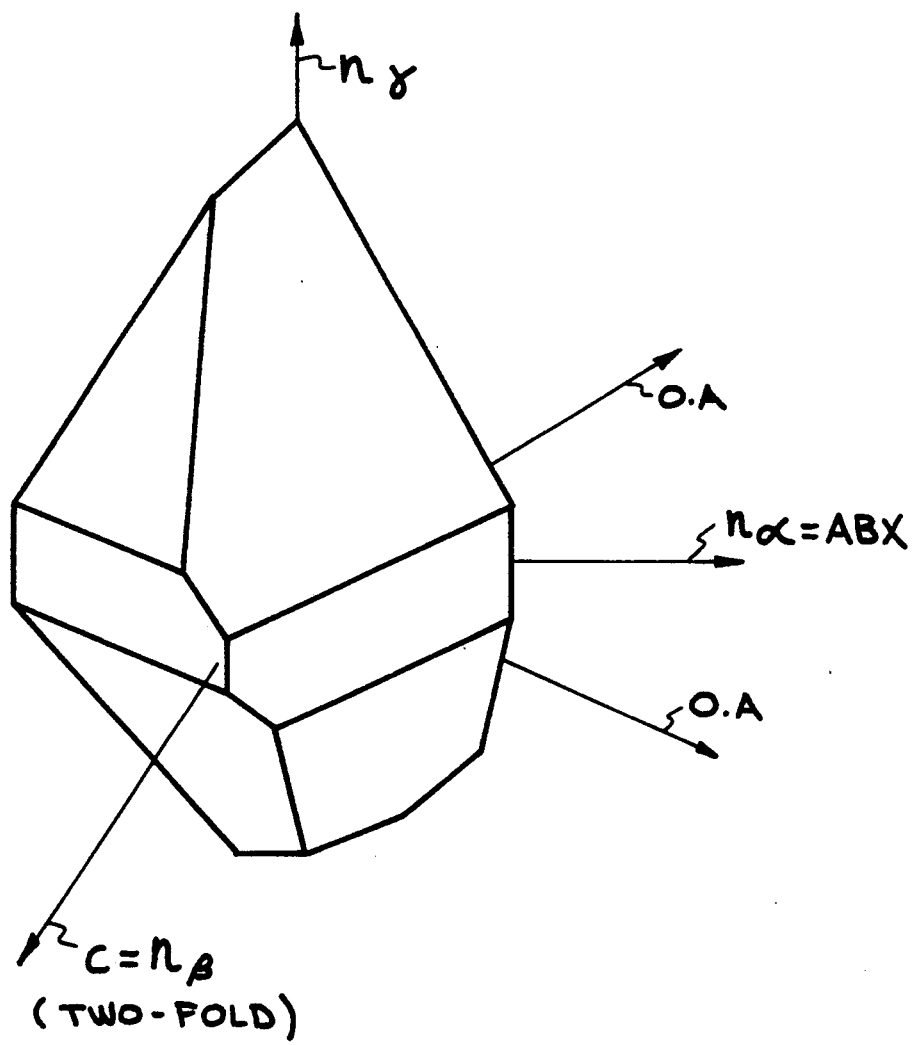
FIG. 1 is a drawing showing the external morphology of a KLND crystal.

The nonlinear and linear optical properties of KLND are consistent with KLND being isostructural with KCND, (i.e. La atoms occupying the Ce sites in the structure). The external morphology of KLND with respect to the dielectric axis is shown in FIG. 1. KLND is orthorhombic and therefore the dielectric and crystallographic axes coincide for all wavelengths. The 2-fold or "c" crystallographic axis is identified as the beta dielectric axis, as determined from an analysis of the KLND frequency doubling data.

The crystal and molecular structure of potassium diaquapentanitrolanthanate (III), KLND, is described in an article by Erickson et al., Acta, Chem. Scand. A 34 (1980) No. 8.

Nothing in that article indicates that the material has frequency mixing properties.

Absorption

The absorption edge in KCND is around 0.390 $\mu$m, which precludes its use for tripling 1.06 $\mu$m light. The absorption edge of KLND is 0.320 $\mu$m.

Refractive Index Measurements

Dispersion measurements of the principal indices of refraction have been completed with small single crystals on a spindle stage refractometer. The room temperature refractive indices have been measured for 9 wavelengths of light between 0.365 and 1.100 $\mu$m; the accuracy of this technique is approximately $n \pm 5 \times 10^{-4}$. The data in Table I(a) and (b) set forth below for each polarization are fit by the method of least squares to the Sellmeier dispersion equation:

$$n^2 = A + \frac{B}{\lambda + C} + D\lambda^2 \quad (1)$$

where $\lambda$ is the wavelength in microns and n is the principal refractive index for that wavelength of light.

TABLE Ia

| Refractive indices of KCND | | | |
|---|---|---|---|
| Wavelength ($\mu$m) | $n_\alpha$ | $n_\beta$ | $n_\gamma$ |
| 0.3650 | 1.5340 | 1.5912 | 1.6142 |
| 0.4005 | 1.5238 | 1.5775 | 1.5999 |
| 0.4872 | 1.50989 | 1.5597 | 1.5811 |
| 0.5461 | 1.5041 | 1.5524 | 1.5732 |
| 0.6476 | 1.4983 | 1.5443 | 1.5653 |
| 0.7500 | 1.4947 | 1.5398 | 1.5603 |
| 0.8500 | 1.4924 | 1.5365 | 1.5567 |
| 0.9500 | 1.4905 | 1.5343 | 1.5542 |
| 1.0500 | 1.4890 | 1.5324 | 1.5519 |

TABLE Ib

| Refractive indices of KLND | | | |
|---|---|---|---|
| Wavelength ($\mu$m) | $n_\alpha$ | $n_\beta$ | $n_\gamma$ |
| 0.3650 | 1.5297 | 1.5820 | 1.6063 |
| 0.4005 | 1.5201 | 1.5702 | 1.5936 |
| 0.4872 | 1.5062 | 1.5530 | 1.5760 |
| 0.5461 | 1.5008 | 1.5456 | 1.5682 |
| 0.6476 | 1.4950 | 1.5387 | 1.5601 |
| 0.7500 | 1.4915 | 1.5341 | 1.5556 |
| 0.8500 | 1.4891 | 1.5306 | 1.5518 |
| 0.9500 | 1.4872 | 1.5285 | 1.5496 |
| 1.0500 | 1.4857 | 1.5269 | 1.5475 |

Sellmeier parameters are given for KCND and KLND in Tables IIa and IIb, respectively.

TABLE IIa

| Sellmeier coefficients (Eq. 1) for KCND | | | | |
|---|---|---|---|---|
| Index | A | B ($10^{-2}\,\mu m^2$) | C ($10^{-2}\,\mu m^2$) | D ($10^{-2}\,\mu m^{-2}$) |
| $n_\alpha$ | 2.21109 | 1.40950 | −3.45830 | −0.638954 |
| $n_\beta$ | 2.33882 | 1.93380 | −3.33504 | −0.793450 |
| $n_\gamma$ | 2.40514 | 1.94084 | −3.71520 | −1.35716 |

TABLE IIb

| Sellmeier coefficients (Eq. 1) for KLND | | | | |
|---|---|---|---|---|
| Index | A | B ($10^{-2}\,\mu m^2$) | C ($10^{-2}\,\mu m^2$) | D ($10^{-2}\,\mu m^{-2}$) |
| $n_\alpha$ | 2.20094 | 1.42619 | −3.13420 | −0.617543 |
| $n_\beta$ | 2.31901 | 2.00108 | −2.47406 | −0.586460 |
| $n_\gamma$ | 2.38504 | 2.08525 | −2.69388 | −0.873084 |

Predicted refractive indices for the Nd:YAG harmonics are reported in Tables IIIa and IIIb. The values calculated from the Sellmeier equations are consistent with the experimentally determined values to ±0.0004.

TABLE IIIa

| Refractive indices of KCND at YAG harmonics | | | |
|---|---|---|---|
| Wavelength ($\mu$m) | $n_\alpha$ | $n_\beta$ | $n_\gamma$ |
| 1.064 | 1.4890 | 1.5321 | 1.5516 |
| 0.532 | 1.5054 | 1.5537 | 1.5749 |
| 0.3547 | 1.5378 | 1.5959 | 1.6194 |

TABLE IIIb

| Refractive indices of KLND at YAG harmonics | | | |
|---|---|---|---|
| Wavelength ($\mu$m) | $n_\alpha$ | $n_\beta$ | $n_\gamma$ |
| 1.064 | 1.4856 | 1.5266 | 1.5473 |
| 0.532 | 1.5020 | 1.5475 | 1.5697 |
| 0.3547 | 1.5334 | 1.5863 | 1.6109 |

Predicted Phase Matching Properties

The Sellmeier parameters are used to calculate phase matching properties including: phase matching orientations, noncritical wavelengths, and angular sensitivities. Although the dispersion data obtained with the spindle stage refractometer are less accurate than that derived by minimum deviation methods which use large, high quality single crystals, they have nonetheless been observed to be in reasonable agreement among predicted and measured phase matching properties for many crystals. The predicted loci for doubling and tripling 1.06 $\mu$m light are typically within two or three degrees of directly measured values.

Figure 2A:
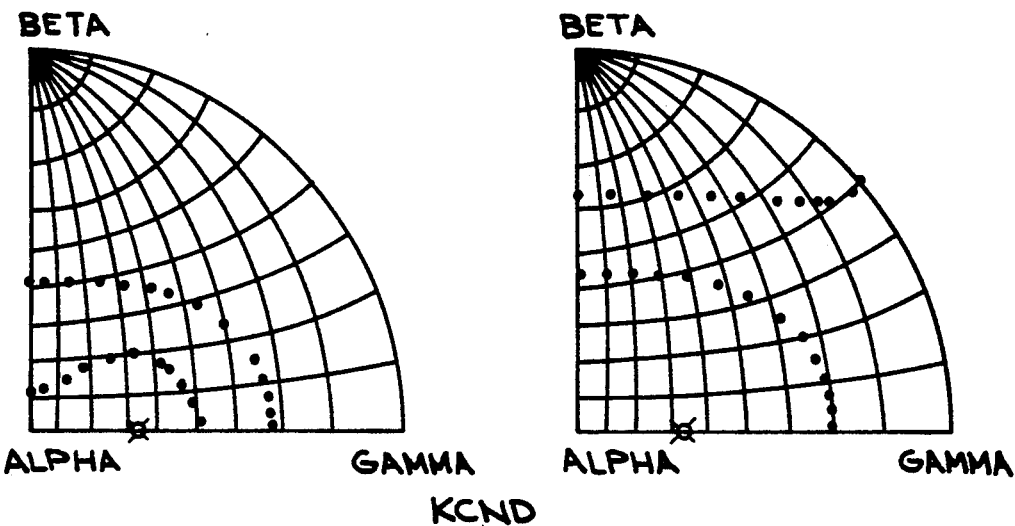
FIG. 2 is a pictogram showing the calculated loci for Type I and Type II frequency doubling and tripling for KCND and KLND.
Figure 2B:
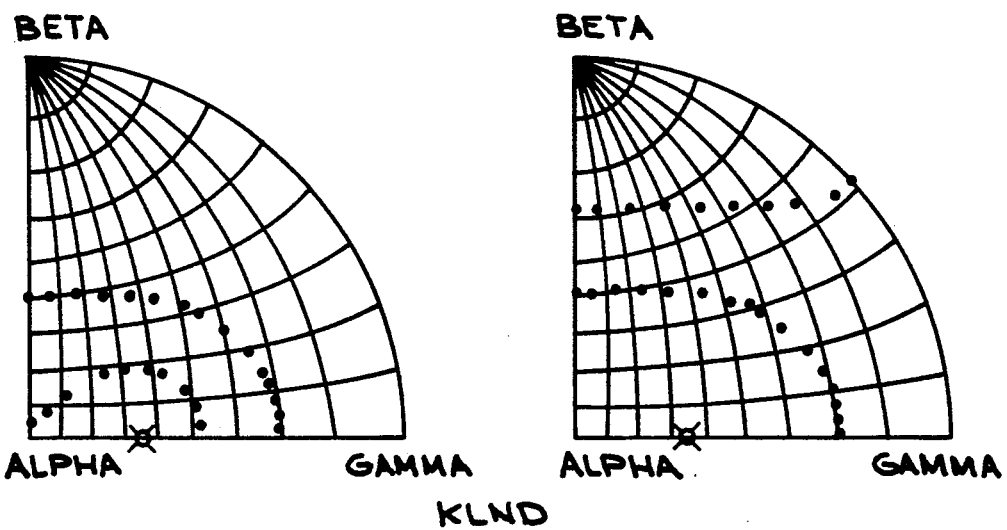
Figure 3:
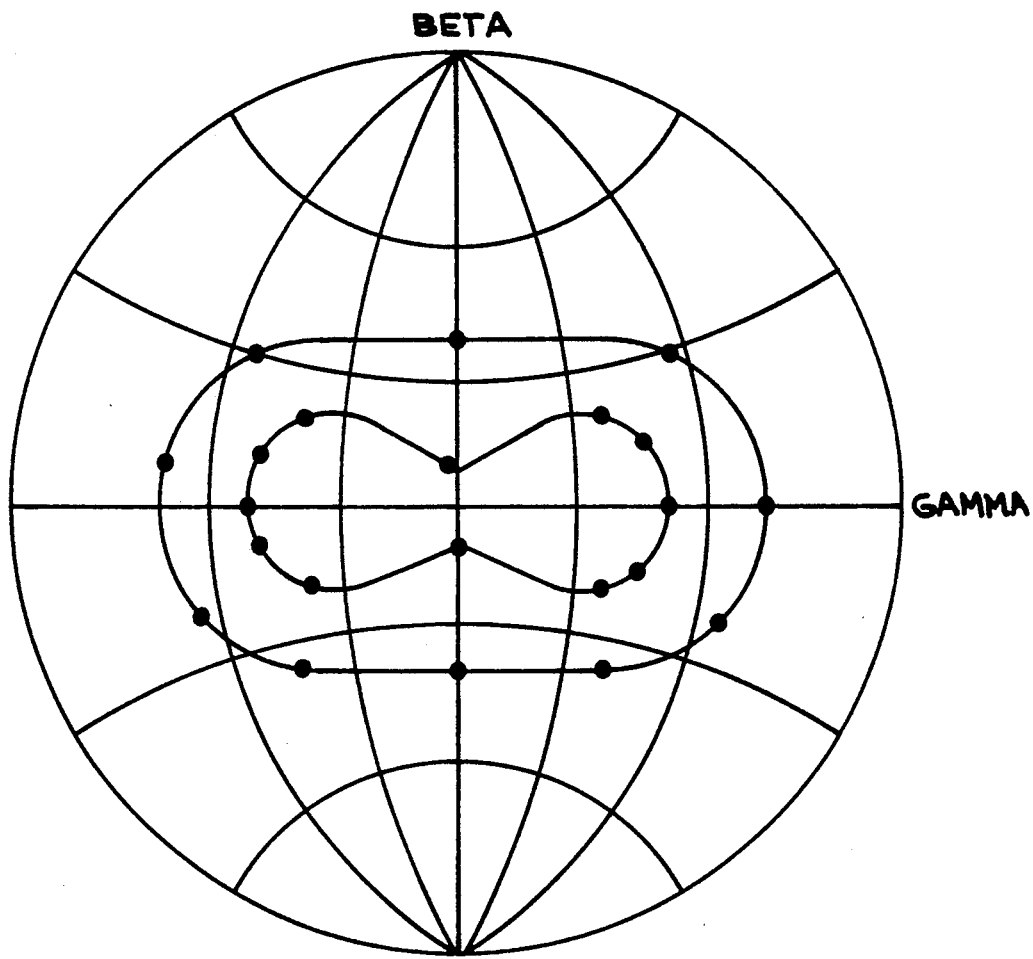
FIG. 3 is a pictogram of phasematching loci of Type I and Type II doubling measured at 1.06 $\mu$m in KCND.
Figure 4:
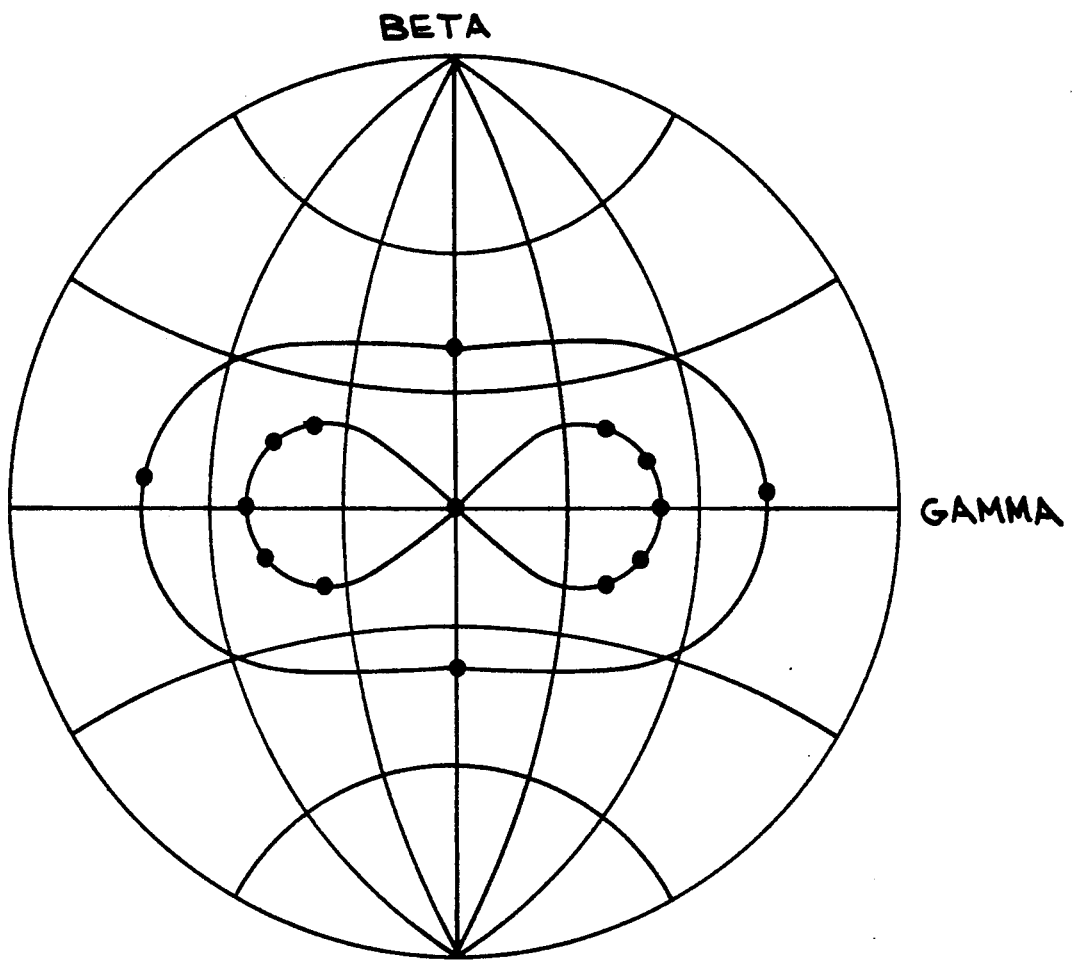
FIG. 4 is a pictogram of phase matching loci of Type I and Type II doubling measured at 1.06 $\mu$m in KLND.
Figure 5:
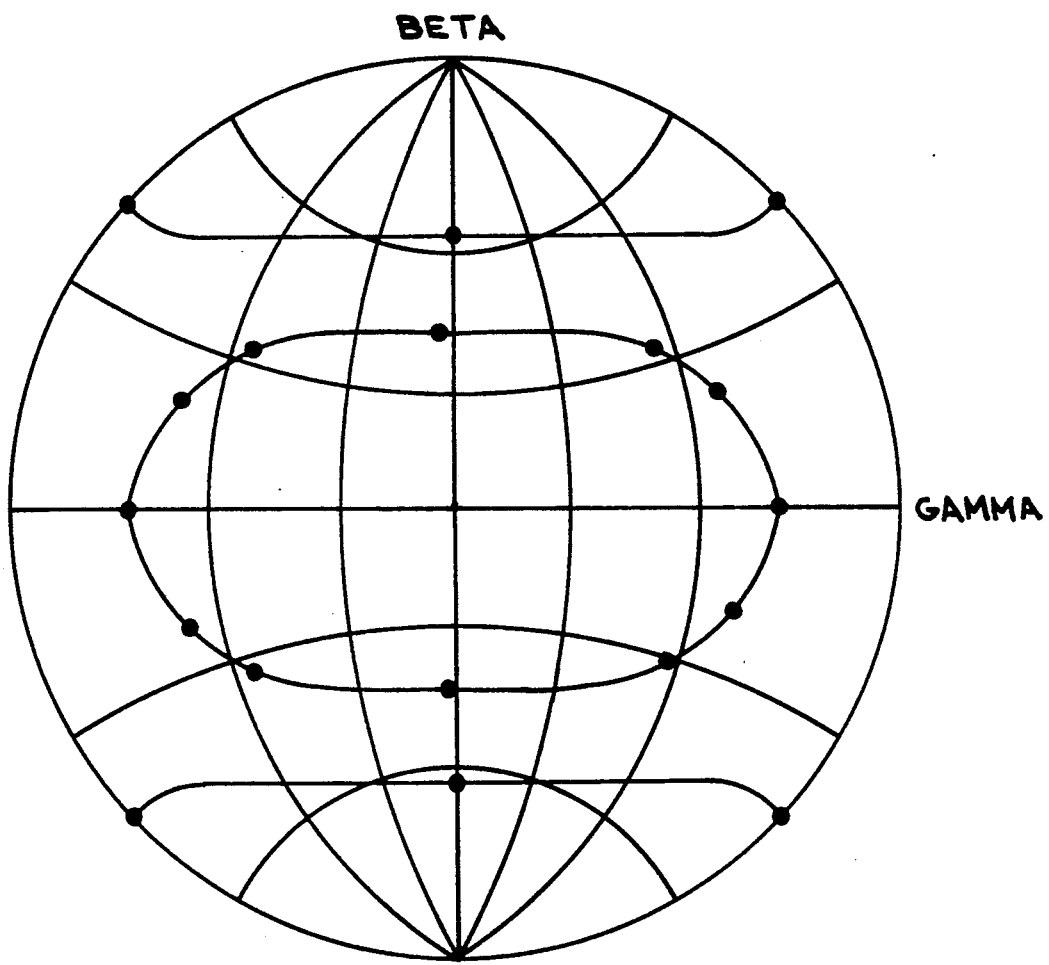
FIG. 5 is a pictogram of phase matching loci of Type I and Type II tripling measured at 1.06 $\mu$m in KLND.
Figure 6:
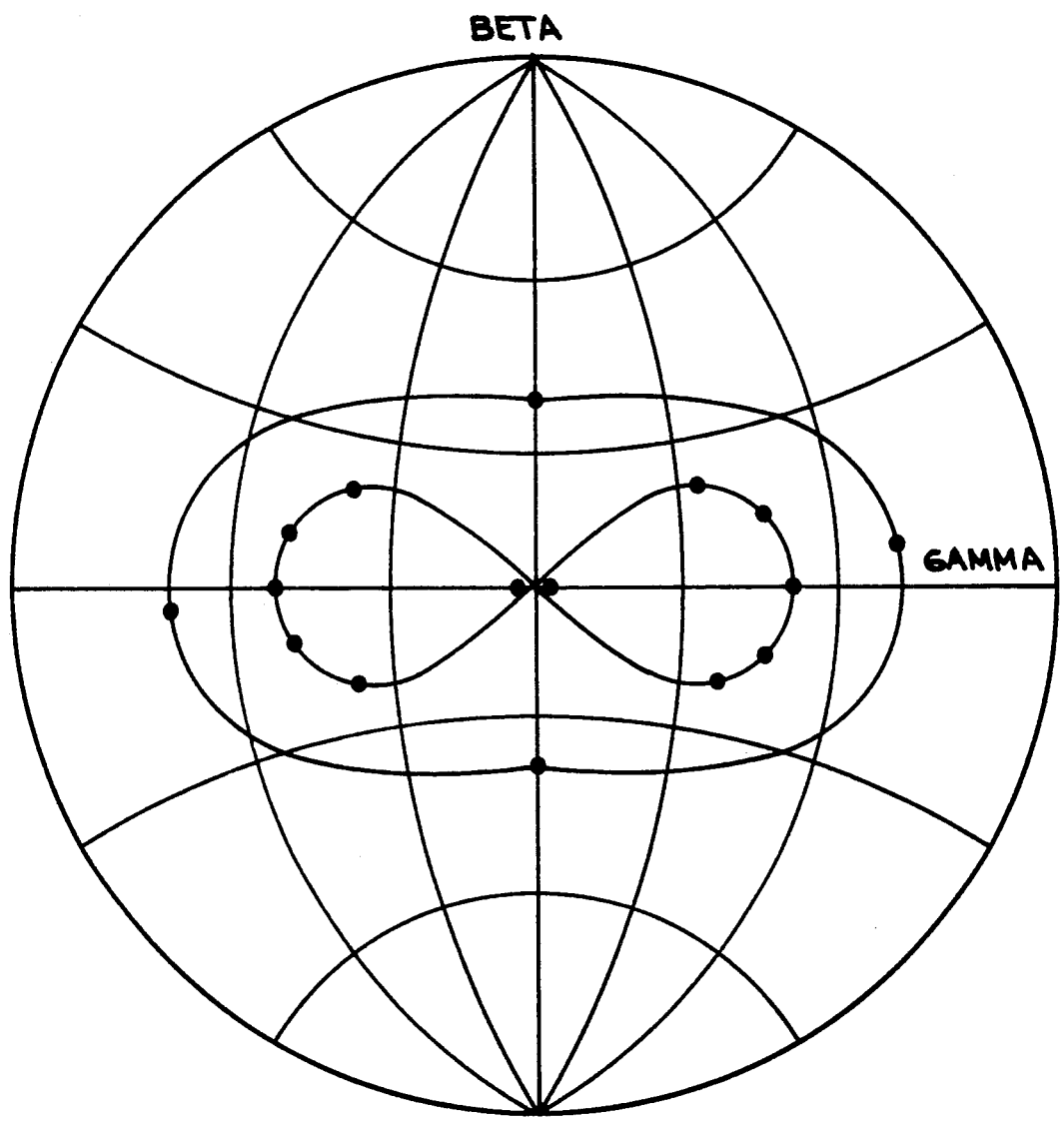
FIG. 6 is a pictogram of phase matching loci of Type I and Type II doubling of 1.06 $\mu$m light in a 75% deuterated sphere of KLND.

The calculated loci for Type I and Type II frequency doubling and tripling are presented in FIG. 2 for KCND and KLND. Direct phase matching measurements have been completed for second harmonic generation in KCND, KLND, and deuterated KLND (FIGS. 3, 4, 6) and for third harmonic generation in KLND (FIG. 5). The calculated and measured loci are in excellent agreement. For Type I doubling of 1.06 $\mu$m laser light, both salts approach noncritical phase matching down the low index axis, $\alpha$, producing an angularly insensitive phase matched point. For frequency tripling of 1.06 $\mu$m laser light, the intersection of the phase matching locus in the low birefringence, $\beta$-$\gamma$, plane for Type II makes this a potentially efficient process in both KLND and deuterated KLND.

Calculated noncritical wavelengths are presented in Table IV. Based on previous experience, these are typically within 0.020 $\mu$m of more accurate determinations obtained from direct measurement or calculated from more accurately determined refractive indices.

TABLE IV

| Predicted noncritical wavelengths of KCND and KLND | | | | | |
|---|---|---|---|---|---|
| Material | Propagation Direction | Type | Coupling Coefficient | $\lambda(2\omega)$ ($\mu$m) | $\lambda(3\omega)$ ($\mu$m) |
| KCND | $\alpha$ | I | $d_{\beta\gamma\gamma}$ | 1.12 | 1.60 |
|  | $\gamma$ | II | $d_{\beta\alpha\alpha}$ | 0.93 | 1.12 |
| KLND | $\alpha$ | I | $d_{\beta\gamma\gamma}$ | 1.10 | 1.57 |
|  | $\gamma$ | II | $d_{\beta\alpha\alpha}$ | 0.94 | 1.12 |

Nonlinear Optical Measurements

Spheres of KCND, KLND and 75% deuterated KLND were characterized using a nonlinear optical goniometer. The phase matching loci are reproduced in FIGS. 4 through 5 for the KLND salt, FIG. 6 for the deuterated KLND salt, and FIG. 3 for the KCND salt. The effective nonlinear couplings ($d_{eff}$'s) measured using the sphere technique are considered as lower bounds on the true $d_{eff}$'s.

As larger crystals of KLND and KCND became available, phase matching plate measurements were performed. Type I doubling plates of KLND and KCND were cut using the angular positions determined from the maxima of the phase matching loci. A Type II KLND doubling plate was also cut. These plates were mounted and placed in index matching fluid. Laser light from a Q-switched, mode-locked 1.06 μm YAG laser was directed through the plates and the amount of doubled light of wavelength 0.532 μm was measured electronically. The efficiency of these plates in producing doubled light was directly compared to that of a Type II KDP standard of comparable thickness. From this the measured effective nonlinear couplings for Type I and Type II doubling are listed in Table IVa.

TABLE IVa

Effective nonlinear coefficients for KLND AND KCND

| Material | Deff (pm/V) Type I 2ω | Type II 2ω |
|---|---|---|
| KLND | 1.13 | 0.84 |
| KCND | 1.09 | —[a] |
| KDP | 0.29 | 0.39 |

[a]Should be identical to Type II of KLND since they are isostructural

Determination of d Coefficients

The most probable point group symmetry and partial optic orientation can be determined from the value of the nonlinear coupling at the points of intersection between the Type I and II doubling loci and the principal planes, and by examining the symmetry patterns of the intensity maxima and minima. The only point group symmetry consistent with the data and not requiring additional restrictions on the sums of the individual nonlinear coefficients is mm2, where $\beta$ is the twofold axis. Assuming Kleinmann's symmetry, it is needed to determine the magnitude and relative signs of three nonlinear coefficients: $d_{\beta\alpha\alpha}$, $d_{\beta\beta\beta}$ and $d_{\beta\gamma\gamma}$, to specify the complete d tensor for the crystal.

Using the sphere data in combination with the plate data for KLND and KCND, we are able to deduce the value and relative sign of the nonlinear coefficients. The coefficients of the nonlinear d tensor are referred to the dielectric axis coordinate system, where $\alpha$ refers to the axis which has an index of refraction of $n_\alpha$, $\beta$ refers to the axis which has an index of refraction of $n_\beta$, $\gamma$ refers to the axis which has an index of refraction of $n_\gamma$, where $n_\alpha < n_\beta < n_\gamma$. The dielectric axes are coincident with the crystallographic axes; a, b, and c, in materials with orthorhombic symmetry, such as KLND. The $\beta$ dielectric axis is coincident with the crystallographic axis c, which is also the 2-fold rotation axis. Table V lists the values of the three nonlinear coefficients of KLND and KCND.

TABLE V

Magnitude of d coefficient tensor components in KLND and KNCD

| $d_{\beta\alpha\alpha}$[a] | $d_{\beta\beta\beta a}$ | $d_{\beta\gamma\gamma a}$ |
|---|---|---|
| −0.62 pm/V | −0.42 pm/V | +1.10 pm/V |

[a]measured relative to KDP $d_{xyz} = 0.39$ pm/V

The coefficients of KLND and KCND are identical within experimental error, which is consistent with the two crystals being isostructural.

KLND Conversion Efficiency and Comparisons

The phase matching properties for second and third harmonic generation in the two nitrates have been tabulated and compared with properties of KDP. The figure of merit used for comparison against other materials is the threshold power $P_{th}$, proportional to $(\beta/d_{eff})^2$, where $\beta$ is the angular sensitivity, the rate of change of wavevector mismatch with respect to angular orientation, and $d_{eff}$ is the effective nonlinearity at that specific crystal orientation. The threshold power is a useful number of comparison when high conversion efficiency is desired. The lower the threshold power, the better the material is for frequency conversion. Table VI gives the relevant phase matching parameters for the optimum positions for each phase matching process in KDP, KLND and KCND.

TABLE VI

Comparison of 2ω and 3ω phasematching properties

| Material | Process | Position (Θ,φ), principal plane | $d_{eff}$ (pm/V) | $\beta_\Theta$ (cm · rad)$^{-1}$ |
|---|---|---|---|---|
| KDP | 2ωI | (90,40.9) | 0.255 | 4905 |
|  | 2ωII | (90,58.7) | 0.346 | 2524 |
|  | 3ωI | (90,47.1) | 0.286 | 7857 |
|  | 3ωII | (90,58.0) | 0.351 | 5369 |
| KCND | 2ωI | (78.2,0)[a], α-β | | 2385 |
|  | | (79.5,0)[b] | 1.09 | 158[c] |
|  | 2ωII | (90,67.7)[a], α-γ | | 3007 |
|  | | (90,68.2)[b] | 0.84 | |
| KLND | 2ωI | (85.8,0)[a], α-β | | 826.4 |
|  | | (89.2,0)[b] | 1.10 | |
|  | 2ωII | (90,69.8)[a], α-γ | | 2678 |
|  | | (90,69.9)[b] | 0.84 | |
|  | 3ωI | (48.3,0)[a], α-β | | 9364 |
|  | | (47.3,0)[b] | 0.83[c] | |
|  | 3ωII | (132,88.6)[a,b], β-γ | 0.46[c] | 2598 |

[a]Calculated from Sellmeier coefficients
[b]Determined from measured loci
[c]Estimated For the nitrate salts we report the properties for phase matching where the highest $d_{eff}$'s are observed in direct SHG measurements of KCND and KLND, and for THG in KLND. Angular sensitivities are determined from the calculated phase matching loci. The loci positions calculated from the dispersion data in general agree very well with the measured positions. The largest discrepancy of 3.4° occurs at the nearly non-critically phase matched (NCPM) point in KLND, the intersection of the locus with the α-β plane. This discrepancy significantly affects the angular sensitivity, which varies approximately as sin (2η) near the dielectric axis. The threshold power quoted in Table VII for Type I doubling in KLND takes this correction into account.

TABLE VII

Threshold Powers (MW)

| Material | 2ωI | 2ωII | Process 3ωI | 3ωII |
|---|---|---|---|---|
| KDP | 529 | 74 | 553 | 167 |
| KCND | 8 | 35 | —[a] | —[a] |
| KLND | 0.8 | 14 | 182 | 22 |

[a]No measurement performed

It is seen that KCND is an effective Type I frequency doubler for Nd:YAG lasers, since its lowest angular sensitivity is observed where the nonlinear SHG coefficient is highest. The threshold power in this case is estimated to be significantly lower than that of KDP. The threshold power in KLND is even lower for Type I SHG since it is approximately 0.8° from being a NCPM doubler. For third harmonic generation, angular sensitivities are reasonably low for both processes in KLND, but more significantly for Type II. As a consequence, the Type II tripling process in KLND also has a much lower threshold power than that of KDP.

The preferred crystal of the invention has the formula $K_2La(NO_3)_5 \cdot H_2O$. This crystal can be made by evaporating an aqueous solution of $La(NO_3)_3 \cdot 6H_2O$, $H_2O$ and $KNO_3$, at a temperature of 57° C. This takes about four days.

For lasers which produce several watts of average power, a preferred crystal is $K_2La(NO_3)_5.2D_2O$. Deuterated crystals are preferred because of lower absorption of the infrared fundamental.

The process of deuteration changes the wavelength at which the material is NCPM, noncritically phase matched. In order to shift this frequency back to 1.06 μm, the most commercially used wavelengths of lasers using YAG as the lasing material, it may be necessary to form a solid solution with the isostructural compound $K_2Ce(NO_3)_5.2D_2O$.

This invention will be more fully understood by reference to the following examples, which are intended to be illustrative of the invention, but not limiting thereof.

EXAMPLE I $K_2La(NO_3)_5.2H_2O$ is crystallized from a solution of $KNO_3$, $La(NO_3)_3.6H_2O$, and water by slow cooling from 56° C. to 30° C. or by slow evaporation of the same solution at 56° C. The resulting crystal is useful as a high efficiency frequency doubler and tripler for wavelengths between 2.0 μm and 0.320 μm. This crystal has nonlinear coefficients of $d_{\beta\alpha\alpha}=-0.62$ pm/V, $d_{\beta\beta\beta}=-0.42$ pm/V, and $d_{\beta\gamma\gamma}=+1.10$ pm/V, measured relative to KDP $d_{xyz}=0.39$ pm/V. This crystal was used as a component in a second harmonic generator and third harmonic generator device with good results. This crystal is an angularly insensitive doubler for wavelengths near 1.06 μm and 0.800 μm.

EXAMPLE II $K_2Ce(NO_3)_5.2H_2O$ is crystallized from a solution of $KNO_3$, $Ce(NO_3)_3.6H_2O$, and water by slow cooling form 56° C. to 30° C. or by slow evaporation of the same solution at 56° C. The resulting crystal is useful as a high efficiency frequency doubler and tripler for wavelengths between 2.0 μm and 0.390 μm. This crystal has nonlinear coefficients of $d_{\beta\alpha\alpha}=-0.62$ pm/V, $d_{\beta\beta\beta}=-0.42$ pm/V, and $d_{\beta\gamma\gamma}=+1.10$ pm/V, measured relative to KDP $d_{xyz}=0.39$ pm/V. This crystal was used as a component in a second harmonic generator device with good results. This crystal is an angularly insensitive doubler for wavelengths near 1.06 μm and 0.800 μm.

EXAMPLE III $K_2La(NO_3)_5.2H_{0.5}D_{1.5}O$ (75% deuterated KLND) is crystallized from a solution of $KNO_3$, $La(NO_3)_3.6H_2O$, and $D_2O$ by slow cooling from 56° C. to 30° C. or by slow evaporation of the same solution at 56° C. The $La(NO_3)_3.6H_2O$ is reduced to $La(NO_3)_3.0.4H_2O$ by drying the material at 160° C. for 8 hours. The dried chemical is added to the $D_2O$ and $KNO_3$ solution. The resulting crystal is useful as a high efficiency frequency doubler and tripler for wavelengths between 2.0 μm and 0.320 μm. This crystal has nonlinear coefficients of $d_{\beta\alpha\alpha}=-0.62$ pm/Vm, $d_{\beta\beta\beta}=-0.42$ pm/V, and $d_{\beta\gamma\gamma}=+1.10$ pm/V, measured relative to KDP $d_{xyz}=0.39$ pm/V. This crystal was used as a component in a second harmonic generator device with good results. This crystal is an angularly insensitive doubler for wavelengths near 1.06 μm and 0.800 μm. This crystal has better efficiency than undeuterated KLND due to lower absorption of the incident light.

EXAMPLE IV $K_2Ce(NO_3)_5.2H_{1.0}D_{1.0}O$ (50% deuterated KCND) is crystallized from a solution of $KNO_3$, $Ce(NO_3)_3.6H_2O$, and $D_2O$ by slow cooling from 56° C. to 30° C. or by slow evaporation of the same solution at 56° C. The resulting crystal is useful as a high efficiency frequency doubler and tripler for wavelengths between 2.0 μm and 0.390 μm. This crystal has nonlinear coefficients of $d_{\beta\alpha\alpha}=-0.62$ pm/V, $d_{\beta\beta\beta}=-0.42$ pm/V, and $d_{\beta\gamma\gamma}=+1.10$ pm/V, measured relative to KDP $d_{xyz}=0.39$ pm/V. This crystal was used as a component in a second harmonic generator device with good results. This crystal is an angularly insensitive doubler for wavelengths near 1.06 μm and 0.800 μm. This crystal has better efficiency than undeuterated KCND due to lower absorption of the incident light.

EXAMPLE V $K_2Pr(NO_3)_5.2H_2O$ (KPrND) is crystallized from a solution of $KNO_3$, $Pr(NO_3)_3.6H_2O$, and $H_2O$ by slow evaporation of a solution of the same stoichiometry as the crystal at 25° C. $Pr(NO_3)_3.6H_2O$ was crystallized from a solution of $Pr_6O_{11}$, $HNO_3$, and $H_2$, where a three times excess of $HNO_3$ was used in order to complete the reaction, as opposed to a stoichiometric amount of $HNO_3$. The resulting crystal is useful as a high efficiency frequency doubler and tripler for wavelengths between 2.0 μm and 0.320 μm. This crystal has nonlinear coefficients greater than those of KPD as determined by the powder second-harmonic generation test. This crystal was used as a component in a second harmonic generator device with good results. This crystal is isostructural to the KLND and KCND type of harmonic generating salts.

EXAMPLE VI $K_2Nd(NO_3)_5.2H_2O$ (KNdND) is crystallized from a solution of $KNO_3$, $Nd(NO_3)_3.6H_2O$, and $H_2O$ by slow evaporation of a solution of the same stoichiometry as the crystal at 25° C. The resulting crystal is useful as a high efficiency frequency doubler and tripler for wavelengths between 2.0 μm and 0.320 μm. This crystal has nonlinear coefficients greater than those of KPD as determined by the powder second-harmonic generation test. This crystal was used as a component in a second harmonic generator device with good results. This crystal is isostructural to the KLND and KCND type of harmonic generating salts.

As previously mentioned, the crystals described herein can be used in a variety of laser devices such as frequency doublers, frequency triplers, optical parametric oscillators, self-doubling laser rods, or as electro-optical switches, to name a few.

Figure 7:
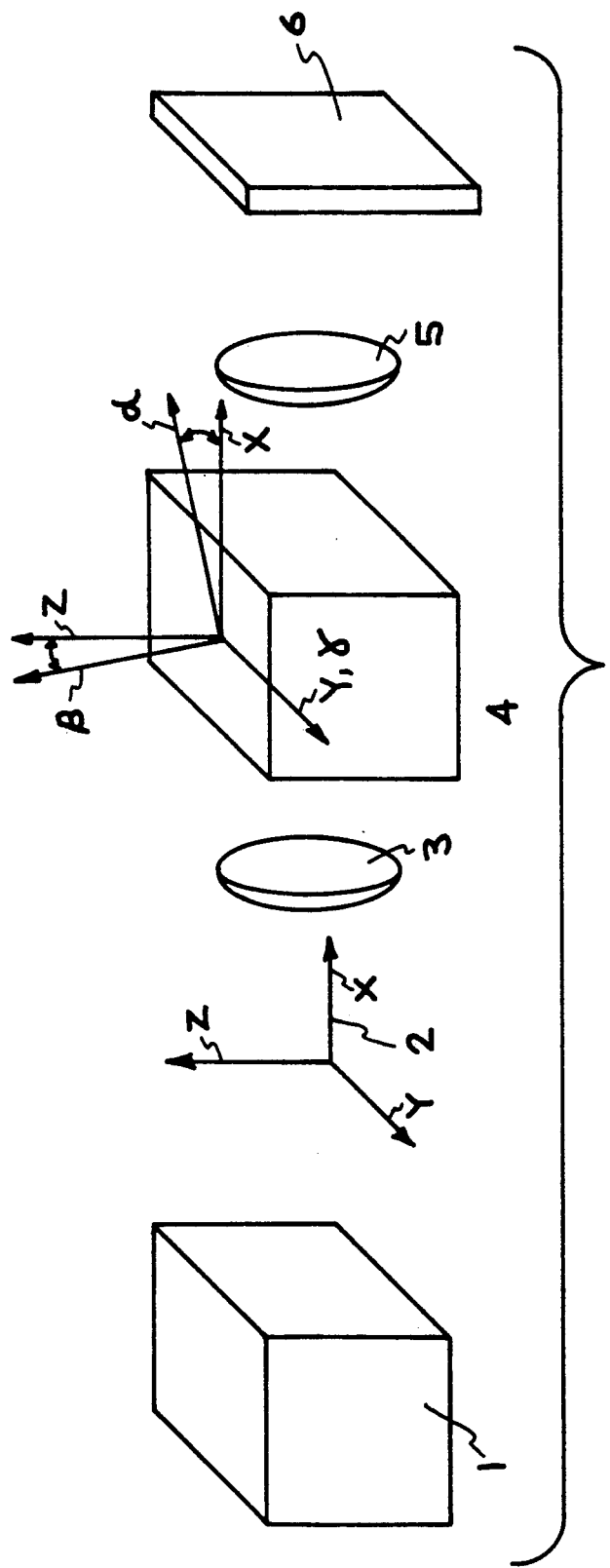
FIG. 7 is a schematic diagram of apparatus incorporating the crystal of this invention.
Figure 8:
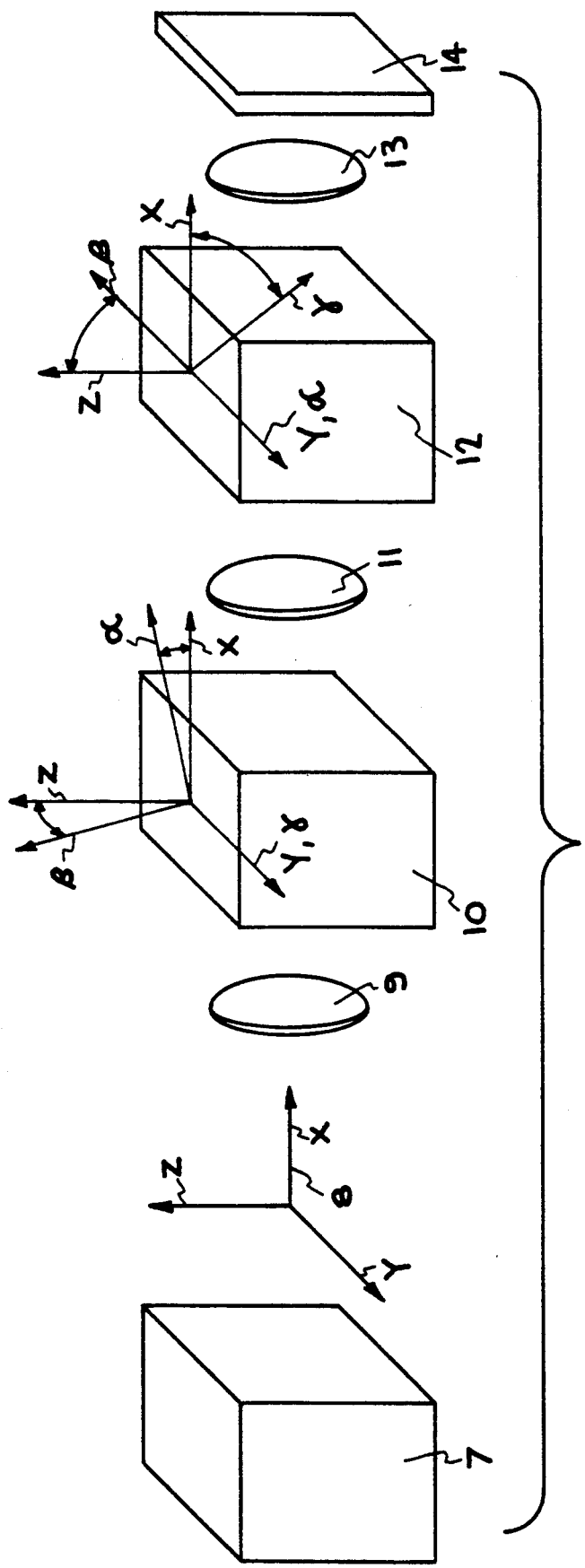
FIG. 8 is a schematic diagram of alternative aapparatus incorporating the crystal of this invention.
Figure 9:
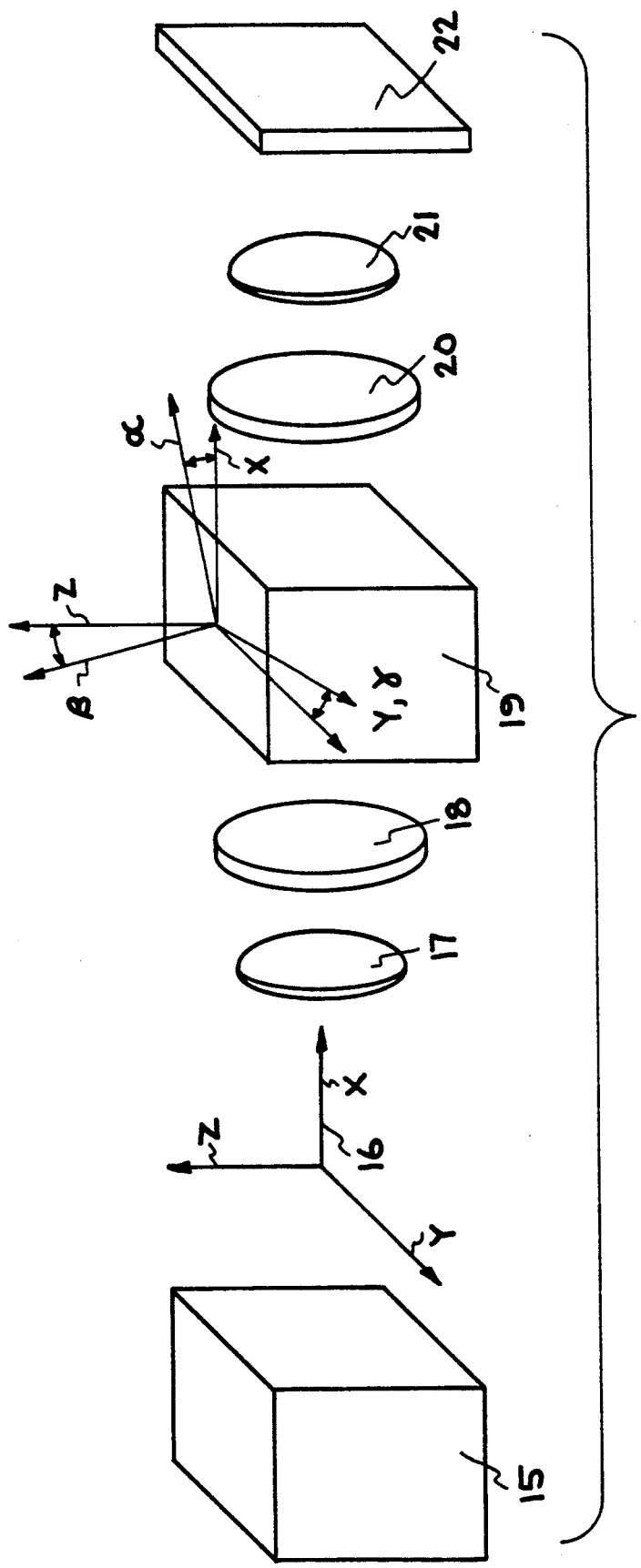
FIG. 9 is a schematic diagram of other alternative apparatus utilizing the crystal of this invention.

Three of such devices are shown schematically in FIGS. 7, 8 and 9.

Referring to FIG. 7, an Nd:YAG laser 1 is shown, which has a wavelength of 1.06 μm, polarization parallel to the "y" reference axis, and an emission propagation direction parallel to the "x" reference axis.

The reference axes are illustrated by number 2.

A focusing lens 3 is positioned in the path of the emissions of the laser 1, and emissions travel from the focusing lens 3 to a KLND crystal 4, which has x, y and z reference axes perpendicular to the crystal faces, and wherein alpha, beta, and gamma are the orthogonal dielectric axes. Gamma is parallel to y, alpha and beta have been rotated 0.8° with respect to the x and z reference axis. Doubled light emission from the KLND crystal is transmitted through a collection lens 5 to a filter 6 which filters out 1.06 μm radiation.

In FIG. 8, there is shown a Nd:YAG laser 7, again having a wavelength of 1.06 μm, and its polarization parallel to the "y" reference axis, with the propagation direction of the emissions parallel to the "x" reference axis.

The reference axes are shown with reference to number 8. The emissions from the laser 7 are transmitted through a focusing lens 9, and from there pass to a KLND doubling crystal 10. This crystal 10 emits green light at 0.532 μm with its polarization parallel to the z axis, and unconverted red light (1.06 μm) still retains the y polarization. A focusing lens 11 collects the emissions from the KLND crystal and the emissions are thereafter passed to a KLND type II tripling crystal 12. This crystal has x, y and z reference axes perpendicular to the crystal faces. Alpha, beta and gamma are the crystal's dielectric axes. Alpha is parallel to y, and beta and gamma have been rotated with respect to z and x by 47.6°. The emissions from the KLND type II tripling crystal 12 are passed through a collection lens 13 to a 0.354 μm bandpass filter 14 which filters out the red and green light, but transmits the tripled light produced.

In FIG. 9 there is shown a frequency doubled Nd:YAG laser 15, similar to the ones described in FIGS. 7 and 8 except that the output is doubled to produce light at 0.532 μm. The reference axes of the laser are shown in number 16. The polarization of the laser output is parallel to the z reference axis. The emissions from the laser 15 pass through a focusing lens 17 and from there unto a mirror 18 which has a high reflectivity for wavelengths between 2.2 μm and 0.7 μm. The emissions pass through the mirror 18, into a KLND crystal 19, where alpha, beta and gamma are the orthogonal dielectric axes.

The crystal 19 may be rotated about the beta dielectric axis which is parallel to the z reference axis.

The crystal 19 may also be rotated about the gamma dielectric axis which is parallel to the y reference axis.

Emissions from the crystal 19 are passed through a mirror 20, which has a moderate reflectivity for wavelengths between 2.2 μm and 0.7 μm, to a collection lens 21, then through a filter 22 which blocks 0.532 μm emission. The light then emitted from the filter 22 is produced by sum and difference frequency generation light and has a wavelength between 2.2 μm and 0.7 μm dependent upon the initial orientation of the crystal.

The foregoing description of preferred embodiments of the invention have been presented for purposes of illustration and description. It is not intended to be exhaustive or to limit the invention to the precise forms disclosed, and obviously many modifications and variations are possible in light of the above teachings. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto and their equivalents.

We claimed:

1. In a laser system for converting infrared laser light waves to visible light comprised of an infrared laser light source and means of harmonic generation associated therewith for production of light waves at integral multiples of the frequency of the original wave, the improvement of said means of harmonic generation comprising a crystal having the chemical formula $$X_2Y(NO_3)_5 \cdot nZ_2O$$

wherein X is selected from the group consisting of Li, Na, K, Rb, Cs, and Tl; Y is selected from the group consisting of Sc, Y, La, Ce, Nd, Pr, Sm, Eu, Gd, Tb, Dy, Ho, Er, Tm, Yb, Lu, Al, Ga, and In; Z is selected from the group consisting of H and D; and n ranges from 0 to 4.

2. The system of claim 1 wherein in said chemical formula X is K; Y is La; Z is H; and n is 2.

3. A harmonic generator comprising a crystal having the chemical formula $$X_2Y(NO_3)_5 \cdot nZ_2O$$

wherein X is selected from the group consisting of Li, Na, K, Rb, Cs, and Tl; Y is selected from the group consisting of Sc, Y, La, Ce, Nd, Pr, Sm, Eu, Gd, Tb, Dy, Ho, Er, Tm, Yb, Lu, Al, Ga, and In; Z is selected from the group consisting of H and D; and n ranges from 0 to 4.

4. The harmonic generator of claim 3 wherein X is K; Y is La; Z is H; and n is 2.

5. A non-linear optical crystalline material comprising a material having the chemical formula $$X_2Y(NO_3)_5 \cdot nZ_2O$$

wherein X is selected from the group consisting of Li, Na, K, Rb, Cs, and Tl; Y is selected from the group consisting of Sc, Y, La, Ce, Nd, Pr, Sm, Eu, Gd, Tb, Dy, Ho, Er, Tm, Yb, Lu, Al, Ga, and In; Z is selected from the group consisting of H and D; and n ranges from 0 to 4.

6. A non-linear crystalline optical material of claim 5 wherein X is K; Y is La; Z is H; and n is 2.

7. The non-linear crystalline optical material of claim 5 wherein X is K; Y is Ce; Z is H; and n is 2.

8. The non-linear crystalline optical material of claim 5 wherein X is K; Y is Pr; Z is H; and n is 2.

9. The non-linear crystalline optical material of claim 5 wherein X is K; Y is La; Z is D; and n is 2.

10. The non-linear crystalline optical material of claim 5 wherein X is K; Y is Ce; Z is D; and n is 2.

11. The non-linear crystalline optical material of claim 5 wherein X is K; Y is Pr; Z is D; and n is 2.

12. A non-linear crystalline optical material having the formula $$K_2La(NO_3)_5 \cdot 2H_2O$$

13. A laser system comprising:
a. a source of infrared light waves
b. means for exciting said source of light waves
c. a harmonic generator capable of doubling the frequency of said light waves, said harmonic generator being a crystal having the chemical composition $X_2Y(NO_3)_5 \cdot nZ_{2-m}H_mO$ wherein X is selected from the group consisting of Li, Na, K, Rb, Cs, and Tl; Y is selected from the group consisting of Sc, Y, La, Ce, Nd, Pr, Sm, Eu, Gd, Tb, Dy, Ho, Er, Tm, Yb, Lu, Al, Ga, and In; Z is selected from the group consisting of H and D; n ranges from 0 to 4; and m ranges from 0 to 2.

14. The laser system of claim 13 wherein said harmonic generator, X is K, Y is La, Z is H, n is 2 and m ranges from 0 to 2.

15. The laser system of claim 13 wherein said harmonic generator, X is K, Y is La, Z is D, n is 2 and m ranges from 0 to 2.

16. In a laser system comprising a laser host, means for excitation thereof, and a harmonic generator for multiplying the frequency of electro-magnetic waves emanating from said host, the improvement of said harmonic generator comprising a frequency mixing crystal having the chemical formula $$X_2Y(NO_3)_5 \cdot nZ_2O$$

wherein X is selected from the group consisting of Li, Na, K, Rb, Cs, and Tl; Y is selected from the group consisting of Sc, Y, La, Ce, Nd, Pr, Sm, Eu, Gd, Tb, Dy, Ho, Er, Tm, Yb, Lu, Al, Ga, and In; Z is selected from the group consisting of H and D; and n ranges from 0 to 4.

17. The system of claim 16 wherein in said chemical formula X is K, Y is La, Z is H, and n is 2.

18. The system of claim 16 wherein in said chemical formula X is K, Y is Ce, Z is H, and n is 2.

19. The system of claim 16 wherein in said chemical formula X is K, Y is Pr, Z is H, and n is 2.

20. The system of claim 16 wherein in said chemical formula X is K, Y is La, Z is deuterium, and n is 2.

21. The system of claim 16 wherein in said chemical formula X is K, Y is Ce, Z is deuterium and n is 2.

22. The system of claim 16 wherein in said chemical formula X is K, Y is Pr, Z is deuterium and n is 2.

* * * * *